(12) United States Patent
Paul et al.

(10) Patent No.: US 9,309,333 B2
(45) Date of Patent: *Apr. 12, 2016

(54) COMMON SOLVENT PROCESS FOR PRODUCING HIGH MOLECULAR WEIGHT HALOBUTYL RUBBER

(75) Inventors: Hanns-Ingolf Paul, Leverkusen (DE); Rolf Feller, Mettmann (DE); John Lovegrove, Sarnia (CA); Adam Gronowski, Sarnia (CA); Andreas Jupke, Leverkusen (DE); Martin Hecker, Köln (DE); Jörg Kirchhoff, Köln (DE); Rainer Bellinghausen, Odenthal (DE)

(73) Assignee: LANXESS International S.A., Granges-Paccot (CH)

( * ) Notice: Subject to any disclaimer, the term of this patent is extended or adjusted under 35 U.S.C. 154(b) by 522 days.

This patent is subject to a terminal disclaimer.

(21) Appl. No.: 12/999,669

(22) PCT Filed: Jul. 9, 2009

(86) PCT No.: PCT/EP2009/058743
§ 371 (c)(1),
(2), (4) Date: Jul. 13, 2011

(87) PCT Pub. No.: WO2010/006983
PCT Pub. Date: Jan. 21, 2010

(65) Prior Publication Data
US 2011/0257342 A1    Oct. 20, 2011

Related U.S. Application Data

(60) Provisional application No. 61/080,803, filed on Jul. 15, 2008.

(51) Int. Cl.
C08F 36/00     (2006.01)
C08F 110/10    (2006.01)
C08F 8/20      (2006.01)
C08F 8/22      (2006.01)

(52) U.S. Cl.
CPC .... C08F 8/20 (2013.01); C08F 8/22 (2013.01)

(58) Field of Classification Search
USPC ............................. 526/335, 348.7; 525/332.3
See application file for complete search history.

(56) References Cited

U.S. PATENT DOCUMENTS

| 2,995,546 | A | 8/1961 | Cottle |
| 3,257,349 | A * | 6/1966 | Johnson, Jr. et al. ......... 523/340 |
| 3,966,692 | A | 6/1976 | Driscoll et al. |
| 5,021,509 | A | 6/1991 | Keller et al. |
| 2002/0151663 | A1 | 10/2002 | Gronowski |

FOREIGN PATENT DOCUMENTS

| CA | 1019095 | 10/1977 |
| EP | 053585 A2 | 6/1982 |

OTHER PUBLICATIONS

International search report in copending application No. PCT/EP2009/058743, dated Sep. 14, 2009 (2 pages).
Ullmann's Ency of Ind Chem, 5th, Completely Revised Ed, vol. A23, Refractory Ceramics to Silicon Carbide, pp. 288-294, 314-318 (1993).
Rubber Tech (3rd Ed. Maurice Morton, Chapter 10, Van Nostrand Reinhold Company pp. 297-300, (1987).
Vladykin, L. N., Viscosity and Some Thermodynamic Properties of Butyl Rubber Solutions in Various Solvents at Low Temperatures, Polymer Science U.S.S.R. vol. 29, No. 2. pp. 354-363 (1987).

* cited by examiner

*Primary Examiner* — Monique Peets

(57) ABSTRACT

An integrated process for the solution polymerization and subsequent halogenation of butyl rubber in a common medium is disclosed. The process comprises providing a solution polymerization reactor containing a C6 medium mixed with a monomer mixture comprising at least an isoolefin monomer and a multiolefin monomer in a mass ratio of monomer mixture to medium of from 61:39 to 80:20. Once polymerized, residual unreacted monomer mixture is separated from the rubber solution using a distillation process. The residual monomers may then be purified and recycled back into the reactor. The separated rubber solution is then halogenated. The process obviates the need for separating the rubber from the medium following polymerization, then re-dissolving it in another solvent for halogenation, thereby saving energy cost. The process optionally employs heat exchangers for the reactor feed streams to further reduce energy consumption.

22 Claims, 2 Drawing Sheets

Series 1 - 4: calculated viscosities of butyl rubber at -80° C in the following solvents:
1 - Isopentane
2 - 50% isopentane, 50% isobutylene
3 - Hexane
4 - 50% hexane, 50% isobutylene Series 5 & 6: measured viscosities of reactor product with 66:34 monomer:solvent in feed at the following temperatures:
5 - at -80°C
6 - at -65°C

COMMON SOLVENT PROCESS FOR PRODUCING HIGH MOLECULAR WEIGHT HALOBUTYL RUBBER

FIELD OF THE INVENTION

The invention relates to an integrated process that uses a common medium for both solution polymerization and subsequent halogenation of butyl rubber. More particularly, the invention relates to a process that employs a common aliphatic medium such as a C6 solvent for both solution polymerization and halogenation of butyl rubber with intermediate distillation to remove unreacted monomers.

BACKGROUND

In the conventional process for producing halobutyl rubber, isobutylene and isoprene monomers are first polymerized in a polar halohydrocarbon medium, such as Methyl Chloride (MeCl) with an aluminum based initiating system, typically either aluminum trichloride ($AlCl_3$) or ethyl aluminum dichloride ($EtAlCl_2$). The butyl rubber does not appreciably dissolve in this polar medium, but is present as suspended particles and so this process is normally referred to as a slurry process. Residual monomers and polymerization medium are then steam stripped from the butyl rubber, before it is dissolved in a halogenation medium, typically a non-polar medium such as hexane (C6). The halogenation process ultimately produces the final chlorinated or brominated product. The conventional process therefore employs separate polymerization and halogenation steps employing two different media. The use of a polar medium for polymerization and a non-polar medium for halogenation necessitates intermediate stripping and dissolving steps and is inefficient from an energy point of view.

The step of separating the monomers and MeCl from the butyl polymer is conducted before halogenation in order to avoid the formation of highly toxic byproducts from the reaction of chlorine or bromine with residual monomers. The normal boiling points of the components used in the process are: MeCl, −24° C.; isobutylene, −7° C.; and, isoprene, 34° C. Any stripping process that removes the heavier of the residual monomers (isoprene) will also remove essentially all of the MeCl and isobutylene. The process of removing all of the un-reacted components from the rubber slurry requires significant amounts of energy. The greater molecular weight (and therefore higher boiling point) of the halogenated monomers also precludes the removal of these species following the halogenation process.

Solution processes for the polymerization of butyl rubber have been known for many years and are practiced commercially in Russia. An example of the solution process is described in Canadian patent 1,019,095, which discloses the use of iso-pentane (C5) as the preferred polymerization medium. The polymers produced using the above process are non-halogenated. Although halogenation could take place in the saturated C5 medium, the presence of residual monomers (isobutylene, iC4, and isoprene, iC5) would lead to formation of the afore-mentioned undesirable by-products during halogenation. The removal of the unreacted monomers is the challenge for such a process and has not been resolved yet. Although it would be desirable to remove the monomers by distillation, the boiling points of the C5 medium (isopentane, 28° C.) is lower than that of the heavier residual isoprene monomer (iC5, 34° C.), therefore this kind of separation is impossible. Even if normal pentane (boiling point 36° C.) were used as the medium, the difference in boiling points would be insufficient to allow effective removal of the isoprene using distillation techniques. As a result, the residual monomers and medium would all have to be stripped together from the butyl rubber, as in the slurry process, with the rubber being subsequently re-dissolved for halogenation. This is, in fact, more energy intensive than halogenation from the conventional slurry process. The use of isopentane (C5) as a common medium for producing halobutyl rubber is therefore not practical using the conventional solution process.

It is known in the art to use hexane (C6) as a polymerization medium in the solution process. However, the viscosity of a polymer solution is strongly dependent upon the viscosity of the medium used. Because the viscosity of a C6 medium is much higher than that of a C5 medium, for a given molecular weight and polymer solids level, the resulting viscosity of the polymer solution is also much higher. This limits polymer solids content to relatively low levels when C6 is used as a solvent, since otherwise the solution becomes too viscous for good heat transfer, pumping and handling. The overall economics of a process depend strongly on the level of polymer solids in the solution or suspension emerging from the polymerization reactor; higher solids levels mean higher conversion and improved economics. In order to make material having a sufficiently high molecular weight for commercial purposes, it is necessary in butyl polymerization to employ relatively low temperatures, often less than −80° C. These low temperatures exacerbate the problem of high solution viscosity and lead to even lower solids levels. In the solution process, it is therefore quite difficult to achieve an economic solids level (conversion) at the desired temperature (molecular weight) when using hexane as a solvent due to high viscosity.

In U.S. Pat. No. 5,021,509 a process is disclosed whereby product from the conventional slurry polymerization process is mixed with hexane to produce a crude rubber solution or cement. The hexane is added to the MeCl-rubber slurry after exiting the polymerization reactor in order to dissolve the rubber in hexane while still finely divided and suspended in the MeCl/monomer mixture. A distillation process is then used to remove MeCl and residual iC4 and iC5 monomers for recycle, leaving just the rubber in a hexane solution ready for halogenation. This so-called "solvent replacement" process still requires that all of the original media left with the rubber after the polymerization stage are removed. The energy requirement is essentially the same as in the conventional process. No common solvent is employed for both polymerization and halogenation.

There still remains a need for a process that uses a common solvent for both polymerization and halogenation, particularly a process that operates within an acceptable range of viscosities in order to allow high rubber solids levels at the desired molecular weight. The process must allow separation of the residual monomers from the solvent prior to halogenation in order to mitigate the formation of undesirable by-products.

SUMMARY OF THE INVENTION

According to an aspect of the invention, there is provided an integrated process for the solution polymerization and subsequent halogenation of the rubber obtained thereby in a common aliphatic medium comprising at least 50 wt.-% of one or more aliphatic hydrocarbons having a boiling point in the range of 45° C. to 80° C. at a pressure of 1013 hPa, the process comprising at least, preferably exclusively the steps of:

a) providing a medium comprising the common aliphatic medium and a monomer mixture comprising at least one isoolefin monomer and at least one multiolefin monomer in a mass ratio of monomer mixture to common aliphatic medium of from 40:60 to 95:5, preferably from 50:50 to 85:15 and more preferably from 61:39 to 80:20;

b) polymerizing the monomer mixture within the medium to form a rubber solution comprising a rubber polymer which is at least substantially dissolved in the medium comprising the common aliphatic medium and residual monomers of the monomer mixture;

c) separating residual monomers of the monomer mixture from the rubber solution to form a separated rubber solution comprising the butyl rubber polymer and the common aliphatic medium, d) halogenating the rubber polymer in the separated rubber solution.

The scope of the invention encompasses any possible combination of definitions, parameters and illustrations listed herein whether in general or within areas of preference.

As used herein the term "at least substantially dissolved" means that at least 70 wt.-%, preferably at least 90 wt.-%, preferably at least 95 wt.-% the rubber polymer obtained according to step b) are dissolved in the medium In an embodiment of the invention the polymerization according to step b) and the provision of a solution according to step a) is effected using a solution polymerization reactor. Suitable reactors are those known to the skilled in the art and include flow-through polymerization reactors.

According to another aspect of the invention, there is provided an integrated process for the solution polymerization and subsequent halogenation of butyl rubber in a common C6 aliphatic medium, the process comprising: providing a solution polymerization reactor containing the C6 aliphatic medium mixed with a monomer mixture comprising at least an isoolefin monomer and a multiolefin monomer in a mass ratio of monomer mixture to medium of from 61:39 to 80:20; polymerizing the monomer mixture within the solution polymerization reactor to form a rubber solution comprising a butyl rubber polymer dissolved in the medium and including residual monomers of the monomer mixture; separating the monomer mixture from the rubber solution to form a separated rubber solution comprising the butyl rubber polymer in the medium; and, halogenating the butyl rubber polymer in the separated rubber solution.

The process may employ distillation to separate un-reacted residual monomers, i.e. the isoolefin monomers and the multiolefin monomers such as iC4 and iC5 from the medium. This mitigates the formation of undesirable halogenation byproducts from the unreacted monomers. The process is conducted at a moderate or relatively high ratio of monomers to common aliphatic medium or C6 medium. Typically, the isoolefin monomers or the mainly iC4 monomer has a significantly lower viscosity than the common aliphatic medium or the C6 medium and therefore, a higher monomer level results in lower overall viscosity. Overall energy efficiency of the process is improved by eliminating the need to separate the rubber from a first diluent or solvent used for polymerization, then re-dissolve it in a second solvent for halogenation. The integrated common solvent process therefore provides improved energy efficiency and a reduction in the number of process steps as compared with conventional non-integrated processes for making halogenated butyl rubber.

BRIEF DESCRIPTION OF THE DRAWING

Having summarized the invention, preferred embodiments thereof will now be described with reference to the accompanying drawings, in which.

DETAILED DESCRIPTION

Figure 1:
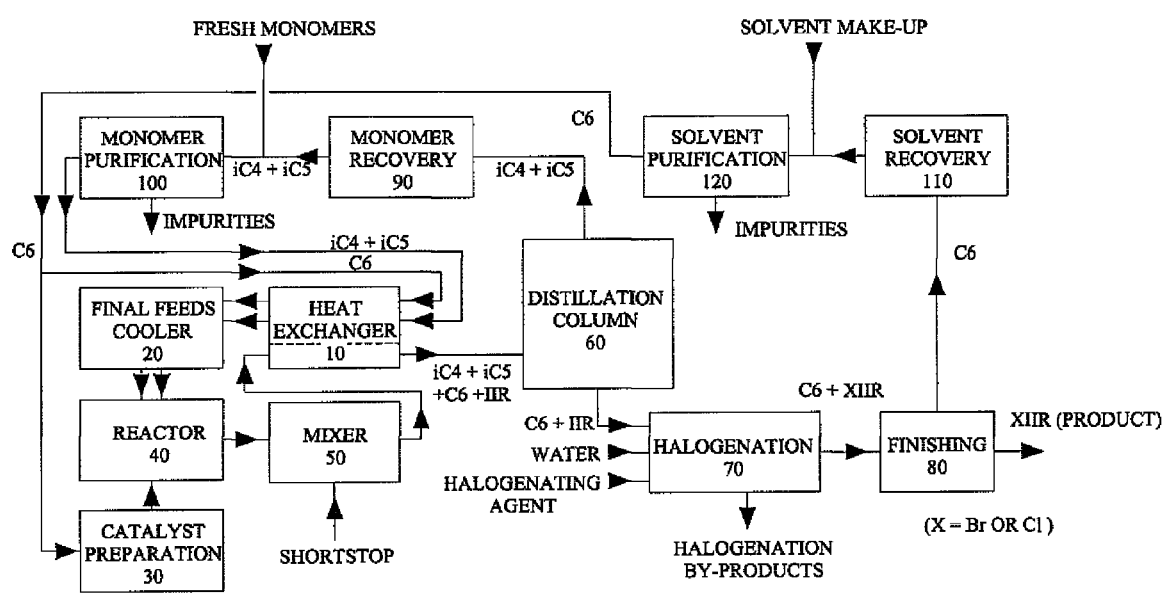
FIG. 1 shows a process flow diagram for a process according to the present invention that employs purification and optional recycle of unreacted monomers following separation thereof from the polymer solution; and, FIG. 2 shows polymer solution viscosity as a function of solids level.

Referring to FIG. 1, a solution polymerization reactor 40 is provided with a feed of monomers, comprising iC4 and iC5, and a feed of a C6 solvent via an optional heat exchanger 10, preferably a recuperative heat exchanger, and final feed cooler 20. The monomers may be pre-mixed with the C6 solvent or mixed within the reactor. It should be noted that the terms "C6 solvent", "C6 organic solvent" and "C6 medium" as used herein all denote a C6 aliphatic medium according to the present invention. A catalyst solution, comprising a carbocationic initiator-activator system of the type used for butyl polymerizations (e.g. a trivalent metal species, such as aluminum, and a small amount of water), is pre-mixed with the C6 solvent in a catalyst preparation unit 30 and also introduced to the reactor 40. The solution polymerization is then allowed to occur within the reactor 40. Solution polymerization reactors 40 of a type suitable for use in the present integrated process, along with process control and operating parameters of such reactors, are described, for example, in EP 0 053 585, which is herein incorporated by reference. Conversion is allowed to proceed to the desired extent and then a reaction stopping agent, for example an alcohol such as methanol, is added and mixed into the reactor discharge stream in mixer 50. The resulting polymer solution comprising unreacted monomers (iC4 and iC5), C6 solvent and butyl rubber (IIR) is passed through a recuperative heat exchanger 10 where it is warmed by the incoming feeds to the reactor, while at the same time helping to cool these feeds before they enter the final feeds cooler 20. The warmed polymer solution is then directed to a distillation column 60 for removal of the unreacted monomers. Once the unreacted monomers have been separated, they exit from the top of the column 60 and the separated polymer solution exits from the bottom of the column 60 to a solution halogenation reactor 70. Additional C6 solvent and/or water may be provided to the halogenation reactor 70 in order to provide the desired conditions for halogenation. It is important to note that the same C6 solvent used for polymerization accompanies the butyl rubber through the process to halogenation and that there is no need to separate the polymer from the solvent prior to halogenation. A feed of a halogenation agent (as described hereinafter) is also provided to the halogenation reactor 70. The halogenated butyl rubber (XIIR) exits the reactor in solution and is then finished using finishing equipment 80, as is conventionally known. C6 solvent removed during the finishing step is sent to solvent recovery 110 prior to introduction to solvent purification section 120. Additional make-up solvent may be added before purification 120 or afterwards, if the solvent has been pre-purified. The purified C6 solvent is recycled back to the recuperative heat exchanger 10 and final feed cooler 20 for re-use in the process. The unreacted monomers (iC4 and iC5) separated from the polymer solution in the distillation column 60 are sent to monomer recovery unit 90 and are then purified in monomer purification section 100 prior to being recycled back to the recuperative heat exchanger 10 and final feed cooler 20. Additional fresh monomers may be added either prior to monomer purification 100 or afterwards, if the monomers have been pre-purified. The use of a common solvent for both polymerization and halogenation reduces environmental impact and improves economic performance of the integrated process as compared with conventional approaches.

The description of the process given hereinabove is exemplary and can be applied to all other media including the common aliphatic medium as well as to all monomer and product compositions mentioned herein.

The monomer mixture used to produce the rubber, preferably a butyl rubber, by solution polymerization is not limited to a specific isoolefin, provided that the individual monomers have boiling points lower than the C6 solvent or lower than 45° C. at 1013 hPa and the monomer mixture has a viscosity less than the C6 solvent or the common aliphatic medium. However, isoolefins within the range of from 4 to 5 carbon atoms, such as isobutene, 2-methyl-1-butene, 3-methyl-1-butene, 2-methyl-2-butene or mixtures thereof are preferred. Most preferred is isobutene.

The monomer mixture is not limited to a specific multiolefin, provided that the individual monomers have boiling points lower than C6 solvent or lower than 45° C. at 1013 hPa and the monomer mixture has a viscosity less than the C6 solvent or the common aliphatic medium. Multiolefins that are known by those skilled in the art to be copolymerizable with the isoolefins mentioned can be used. However, multiolefins comprising dienes, in particular conjugated dienes, within the range of from 4-5 carbon atoms, such as isoprene, butadiene or mixtures thereof are preferably used. Isoprene is most preferably used.

In one embodiment, the monomer mixture for the preparation of rubber, preferably butylrubber, may comprise in the range of from 95% to 99% by weight of at least one isoolefin monomer and in the range of from 1% to 5% by weight of at least one multiolefin monomer. More preferably, the monomer mixture comprises in the range of from 96% to 98% by weight of at least one isoolefin monomer and in the range of from 2% to 4% by weight of at least one, preferably a multi-olefin monomer. Most preferably, the monomer mixture comprises about 97% by weight of at least one isoolefin monomer and about 3% by weight of at least one multiolefin monomer. The isoolefin is preferably isobutene and the multiolefin is preferably isoprene. The multiolefin content of butyl rubbers produced according to the invention is at least 0.5 mol %, more preferably greater than 1.0 mol %, yet more preferably greater than 1.5 mol %, even more preferably greater than 1.8 mol % up to about 2.0 mol % and most preferably greater than 1.8 mol % up to 2.0 mol %.

In another embodiment, the monomer mixture for the preparation of butyl rubber may comprise in the range of from 85% to 96.5% by weight, preferably 85% to 95% by weight of at least one isoolefin monomer and in the range of from 3.5% to 15%, preferably 5% to 15% by weight of at least one multiolefin monomer. More preferably, the monomer mixture comprises in the range of from 90% to 95% by weight of at least one isoolefin monomer and in the range of from 5% to 10% by weight of a multiolefin monomer. Yet more preferably, the monomer mixture comprises in the range of from 92% to 94% by weight of at least one isoolefin monomer and in the range of from 6% to 8% by weight of at least one multiolefin monomer. The isoolefin is preferably isobutene and the multiolefin is preferably isoprene. The multiolefin content of butyl polymers produced according to the invention is at least 2.1 mol % more preferably greater than 2.5 mol %, yet more preferably greater than 3.0 mol % even more preferably greater than 3.5 mol %, even still more preferably greater than 3.5 mol % up to 5.0 mol %

One of the ways in which the aforementioned viscosity problems have been overcome is by selecting a high ratio of monomers to solvent in the polymerization step. Although mass ratios of up to 60:40 monomers to aliphatic hydrocarbon solvent have been used in the prior art, in one aspect the present invention utilizes higher ratios, for example from 61:39 to 80:20, preferably from about 65:35 to 70:30, more preferably about 66:34. The presence of higher monomer levels, which are predominantly C4 and have lower viscosity than the C6 solvent, reduces the solution viscosity to within tolerable limits and also permits a higher solids level to be achieved during polymerization. Use of higher monomer levels also allows an acceptable molecular weight to be reached at a higher temperature than when lower levels of monomer are employed. The use of higher temperature in turn reduces solution viscosity and permits greater polymer solids level in the solution.

A C6 solvent is particularly selected as one preferred choice for use in this process. A lower molecular weight solvent, such as C5 or lighter, has a boiling point close to the monomers and the monomers therefore could not be separated from the solution by distillation. A higher molecular weight solvent, such as C7 or heavier, would be difficult to separate from the rubber after halogenation. The solution viscosity provided by use of a C7 solvent is also significantly higher than with a C6 solvent, making the solution more difficult to handle and impeding heat transfer in the reactor, even when provided with the high monomer to solvent ratios described above. As a result, the C6 solvents of the present invention are a preferred selection from among the available solvents. C6 solvents suitable for use in the present invention have a boiling point of between 50 and 69° C. Examples of preferred C6 solvents include n-hexane or hexane isomers, such as 2-methyl pentane or 3-methyl pentane, or mixtures of n-hexane and such isomers as well as cyclohexane.

In another preferred embodiment of the invention the common aliphatic medium comprises at least 80 wt.-% of one or more aliphatic hydrocarbons having a boiling point in the range of 45° C. to 80° C. at a pressure of 1013 hPa, preferably at least 90 wt.-% and even more preferably at least 95 wt.-%. Aliphatic hydrocarbons having a boiling point in the range of 45° C. to 80° C. at a pressure of 1013 hPa include cyclopentane, 2,2-dimethylbutane, 2,3-dimethylbutane, 2-methylpentane, 3-methylpentane, n-hexane, methylcyclopentane and 2,2-dimethylpentane.

The common aliphatic medium may, for example further comprise other compounds which are inert under polymerization conditions such as other aliphatic hydrocarbons like for example heptanes and octanes having a boiling point of more than 80° C. at a pressure of 1013 hPa, propanes, butanes, n-pentane, cyclohexane as well as halohydrocarbons such as methylchloride and other chlorinated aliphatic hydrocarbons which are inert under reaction conditions.

In another preferred embodiment of the invention the common aliphatic medium is substantially free of halohydrocarbons.

As used herein the term "substantially free" means a content of halohydrocarbons within the common aliphatic medium of less than 2 wt.-%, preferably less than 1 wt.-%, more preferably less than 0.1 wt.-% and even more preferably absence of halohydrocarbons.

The preferred ratio of monomers to a hydrocarbon solvent differs from the teaching of the prior art and was not calculable in advance. Although increasing the amount of monomers should reduce solution viscosity, making accurate theoretical predictions of the extent of that reduction is not feasible due in part to the complex effect on viscosity of the interaction of various components of the solution at the concentrations and temperatures employed in the process.

In one embodiment, the process temperature is in the range of −100° C. to −40° C., preferably in the range of −95° C. to −65° C., preferably greater than about −80° C. in the range of −90° C. to −75° C., more preferably greater than about −75° C. in the range of −85° C. to −75° C., yet more preferably greater than about −70° C. in the range of −80° C. to −75° C., even more preferably greater than or equal to about −65° C. Although higher temperatures are desirable in that energy usage for refrigeration and pumping (due to lower viscosity at higher temperature) are reduced, this generally leads to lower molecular weight polymers that are not as commercially desirable. However, due to the use of high monomer to solvent ratios in the present invention, a reduced but still acceptable molecular weight can be obtained with higher temperatures. Therefore, in an alternative embodiment, temperatures in the range of −50° C. to −74° C., preferably −55° C. to −72° C., more preferably −59° C. to −70° C., yet more preferably −61° C. to −69° C., are used while still obtaining the desired molecular weight of butyl rubber. A most preferred temperature is about −65° C.

The weight average molecular weight of butyl rubber polymers produced using the processes according to the invention, as measured prior to halogenation, typically is in the range of 300 to 1000 kg/mol, preferably 300 to 700 kg/mol, more preferably 325 to 650 kg/mol, even more preferably 350 to 600 kg/mol, yet more preferably 375 to 550 kg/mol, even more preferably 400 to 500 kg/mol. Molecular weights are obtained using gel permeation chromatography in tetrahydrofuran (THF) solution using polystyrene molecular weight standards.

The viscosity of the solution at the discharge of reactor 40 is typically and preferably less than 2000 cP, preferably less than 1500 cP, more preferably less than 1000 cP. A most preferred range of viscosity is from 500 to 1000 cP.

The solids content of the solution following polymerization is preferably in the range of from 3 to 20%, more preferably 10 to 18%, even more preferably from 12 to 18%, yet more preferably from 14 to 18%, even more preferably from 14.5 to 18%, still more preferably 15 to 18%, most preferably 16 to 18% by weight. As described previously, higher solids levels are preferred, but entail increased solution viscosity. The higher monomer to solvent ratios used in the present process allow higher solids levels to be achieved than in the past and advantageously also permit use of a single solvent for both polymerization and halogenation.

As used herein the terms "solids content" or "solids level" refer to weight percent of the polymer obtained according to step b) i.e. in polymerization and present in the rubber solution.

Unreacted residual monomers are removed from the solution following polymerization preferably using a distillation process. Distillation processes to separate liquids of different boiling points are well known in the art and are described in, for example, the *Encyclopedia of Chemical Technology*, Kirk Othmer, 4th Edition, pp. 8-311, which is incorporated herein by reference. The degree of separation is largely dependent upon the number of trays used in the column. An acceptable and preferred level of residual monomers in the solution following separation is less than 20 parts per million by weight. About 40 trays have been found sufficient to achieve this degree of separation. Separation of the C6 medium or the common aliphatic medium from the monomers is not as critical and levels of around 1 wt % are acceptable in the overhead stream from the distillation process.

Following removal of the unreacted residual monomers, the butyl polymer is halogenated. The halogenated butyl rubber is produced using solution phase techniques. A "cement" comprising a solution of the butyl rubber dissolved in at least the C6 organic solvent or the common aliphatic medium used during the polymerization step is treated with a halogenation agent. Supplemental solvent, for example comprising fresh C6 solvent or fresh common aliphatic medium, and/or water may be added to the separated rubber solution in order to form a cement having the desired properties for halogenation. Halogenation in the C6 organic solvent or the common aliphatic medium used during the polymerization step advantageously saves energy as compared with the conventional slurry process by eliminating the need for separating the polymer from the polymerization medium, then re-dissolving it in a different medium for halogenation.

Preferably, the butyl polymer is brominated or chlorinated in the halogenation process. Preferably, the amount of halogen is in the range of from about 0.1 to about 8%, preferably in the range of 0.1 to 8%, more preferably from about 0.5% to about 4%, more preferably from about 0.8% to about 3%, even more preferably in the range of 1.2 to 2.5%, even still more preferably from about 1.5% to about 2.5% and most preferably even more preferably from 1.5 to 2.5% by weight of the polymer.

The halogenation agent may comprise elemental chlorine ($Cl_2$) or bromine ($Br_2$) and/or organo-halide precursors thereto, for example dibromo-dimethyl hydantoin, tri-chloro isocyanuric acid (TClA), n-bromosuccinimide, or the like. Preferably, the halogenation agent comprises or is bromine or chlorine. The amount of halogenation during this procedure may be controlled so that the final polymer has the preferred amounts of halogen described hereinabove. The specific mode of attaching the halogen to the polymer is not particularly restricted and those of skill in the art will recognize that modes other than those described above may be used while achieving the benefits of the invention. For additional details and alternative embodiments of solution phase halogenation processes, see, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company© 1987), particularly pp. 297-300, which are incorporated herein by reference.

Referring again to FIG. 1, the process of the present invention preferably includes purification of the un-reacted monomers separated from the polymerization solution using the distillation column 60. A purification unit 100 may be provided for this purpose; alternatively, purification can take place offsite in a separate purification unit. The purified monomers are normally recycled back into the process and mixed with fresh monomers; however, they may alternatively be utilized in a different process or sold separately. Preferred embodiments of the process include these optional purification and recycling steps in order to achieve advantageous overall process economics.

Purification of monomers may be carried out by passing through adsorbent columns containing suitable molecular sieves or alumina based adsorbent materials. In order to minimize interference with the polymerization reaction, the total concentration of water and substances such as alcohols and other organic oxygenates that act as poisons to the reaction are preferably reduced to less than around 10 parts per million on a weight basis. The proportion of monomer that is available for recycle depends on the degree of conversion obtained during the polymerization process. For example, taking a preferred ratio of monomer to C6 aliphatic medium of 66:34, if the solids level in the rubber solution produced is 10%, then 85% of the monomer is available to be returned in the recycle stream. If the solids level is increased to 18%, then 73% of the monomer is available for recycle.

EXAMPLE 1

Viscosity

Figure 2:
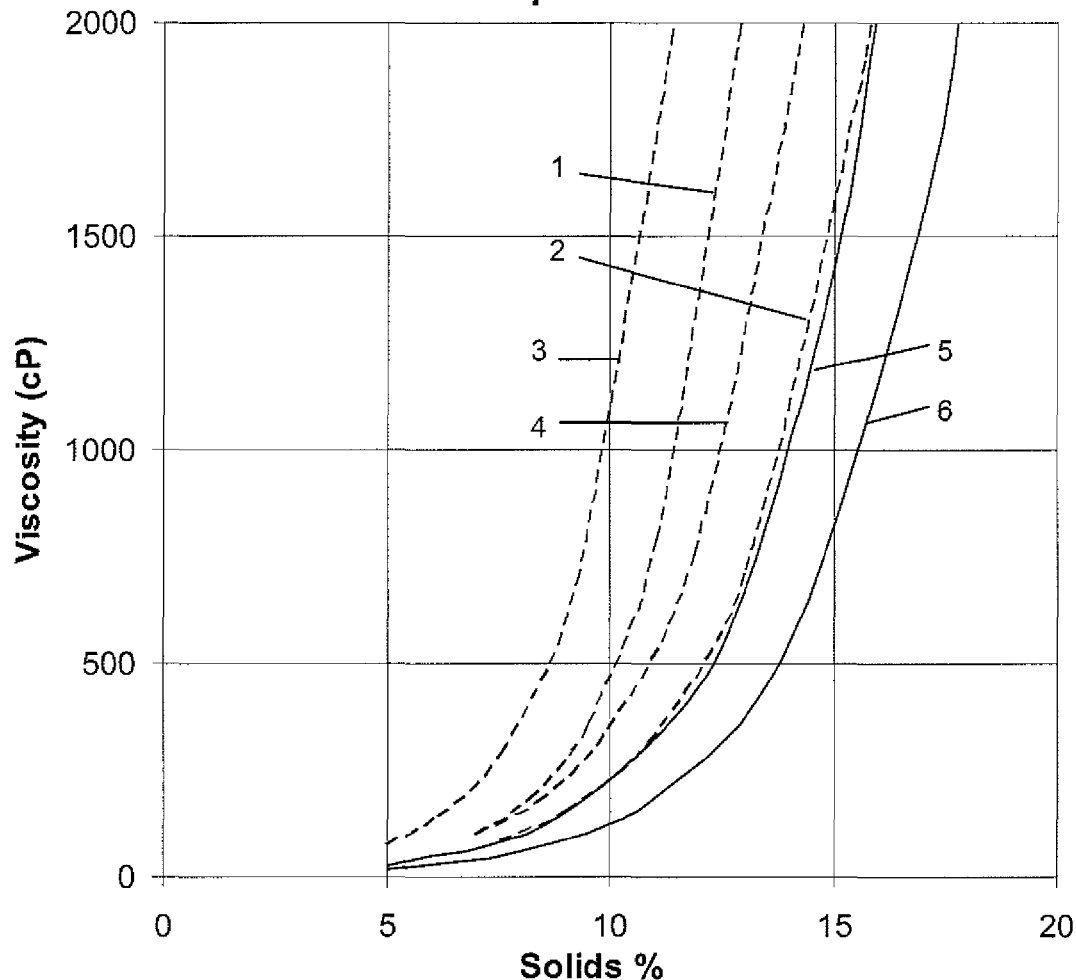

FIG. 2 shows solution viscosity as a function of polymerization medium, starting monomer content, solids level and temperature. Values calculated using the methodology of Vladykin, et al (Polymer Science U.S.S.R. Vol. 29, No. 2, pp. 354-363, 1987) are provided on FIG. 2. These values are based on a polymer with a weight average molecular weight of 450 kg/mol. However, the teachings of Vladykin, et al. are limited to hexane, isopentane and mixtures thereof with up to 50% of iC4. These values are shown as broken lines in FIG. 2. To compare viscosities of rubber solutions produced using feeds with higher initial monomer levels with predictions from the Vladykin teachings for lower monomer levels, viscosity measurements were carried out using solutions from actual polymerization experiments. This data was then extended using the methodology of Vladykin to cover a wider range of solids levels. These values are shown as solid lines in FIG. 2. It is worthwhile to note that solution viscosity data is also provided in CA 1,019,095; however, this data is provided for a Mooney viscosity at 100° C. of 70 units; this corresponds to a weight average molecular weight of around 615 kg/mol and is therefore not comparable with the data provided in FIG. 2. Persons skilled in the art would expect significantly higher solution viscosity values for solutions of these prior art polymers as compared with those having a molecular weight of 450 kg/mol.

In operating the process, it is desirable to obtain the highest possible solids level while still achieving a target viscosity that is low enough to permit sufficient heat removal to take place in the reactor and to be able to pump the solution using conventional polymerization equipment. In general, the target viscosity should be below 2000 cP and, when surface heat transfer is utilized, below 1000 cP. When no monomers are present, the viscosity of rubber solutions in pure isopentane (Series 1) and pure hexane (Series 3) at −80° C. are shown on FIG. 2. A temperature of around −80° C. was selected for comparison, since it is mentioned in several places in CA 1,019,095 as the temperature required to obtain polymers with the desired properties. It can be seen that solutions in pure hexane have higher viscosities over the whole range of solids content than solutions in isopentane. When these solutions are provided with 50% iC4 monomers (Series 2 and Series 4, respectively), a lowering of viscosity takes place at all solids levels. Although a target viscosity of less than 2000 cP can be obtained at a practical solids level of about 16% when isopentane is used as the solvent (Series 2), when hexane is used (Series 4), the maximum solids level that meets the target viscosity is about 14%. This effect is exacerbated when the target viscosity is lowered to 1000 cP, which yields a maximum solids content in isopentane of about 14% and in hexane of about 12%. However, as mentioned previously, it is desirable in an integrated halogenation process to operate using hexane (C6) as the solvent.

The benefit of a higher initial monomer level in the reactor feed can be seen in FIG. 2, Series 5. At the same temperature of −80° C. the higher monomer level with a C6 solvent results in essentially the same viscosity characteristics as when using a C5 solvent and a lower monomer level (Series 2). It has been found that the higher monomer level has a further advantage because laboratory experiments demonstrate that it allows target molecular weights to be obtained at higher polymerization temperatures. In pilot scale work it has been found that target molecular weights of 450 kg/mol can be obtained at −65° C. and this leads to an even more advantageous viscosity characteristic as shown in FIG. 2 Series 6. For a limiting viscosity of 2000 cP this allows a solids content in the stream discharged from the reactor of around 18% and for a limiting viscosity of 1000 cP the solids content can be around 16%. The added advantage of operating at higher temperature is reduced energy demand, which improves process economics and reduces environmental impact. The optimum process operating condition to produce polymers of a molecular weight of about 450 kg/mol at a solids content of 16-18% in hexane is about 66% monomers at a temperature of about −65° C. This combination of process parameters could not have been predicted using previously published data and was obtained through experimental optimization of solvent choice, monomer to solvent ratio, reaction temperature and solids content while meeting a target solution viscosity and polymer molecular weight.

EXAMPLE 2

Polymerization and Distillation

Key elements of the process described in FIG. 1 have been operated at pilot scale with reactors of 2 litre total capacity running in a continuous mode. Feeds to the reactors were 3.87 kg/h of iC4, 0.09 kg/h of iC5 and 2.0 kg/h of hexane giving a monomer/hexane mass ratio of 66:34. The reaction temperature used was −65° C. and a solution with 16 wt % of polymer was produced. This material had a weight average molecular weight of about 440 kg/mol and an isoprene content of about 1.7 mol %. The solution from the reactors was fed to a distillation column with 40 trays and separation of the monomers from the rubber solution was performed. The solution was preheated to 42° C. and a re-boiler was used at the bottom of the column to maintain a bottom temperature of 113° C. A reflux condenser was used to return part of the overhead stream to the top of the column maintaining a temperature there of 36° C. The separation achieved in the column left less than 10 ppm of residual isoprene monomer in the separated rubber solution and 1.2% of hexane in the overhead monomer stream. The separated monomers were purified, then re-introduced to the solution polymerization reactor. The separated rubber solution in the hexane solvent was such that bromination could be accomplished by conventional means with addition of supplemental hexane solvent.

EXAMPLE 3

Halogenation

The separated rubber solution of Example 2 is halogenated using pilot scale halogenation equipment. Supplemental solvent in an amount of 10% is added to the separated rubber solution in order to lower the viscosity. A brominated butyl polymer containing 1.6% bromine is produced in the separated rubber solution. The halogenated separated rubber solution is then finished using conventional drying and finishing techniques.

EXAMPLE 4

Polymerization with Recycled Monomers and Recycled C6 Solvent

The process of Example 2 is operated with a purified overhead stream augmented with the addition of recycled C6 solvent obtained from the drying and finishing of halogenated butyl rubber. The reactor is then operated and a rubber solution is produced that is comparable to the rubber solution described in Example 2.

EXAMPLE 5

Polymerization with Recycled Monomers and Recycled Solvent

The process of Example 4 is operated using commercially available technical hexane as the common aliphatic medium. The technical hexane was consisting of 2.0 wt.-% butanes and pentanes having a boiling point below 45° C. at a pressure of 1013 hPa, 97.5 wt.-% pentanes and hexanes having a boiling point in the range of 45° C. to 80° C. at a pressure of 1013 hPa, 0.5 wt.-% hexanes, heptanes and octanes having a boiling point above 80° C. at a pressure of 1013 hPa, The organometallic catalyst, an activated Lewis acid, was dissolved in the technical hexane and activated by traces of water.

Key elements of the process described in FIG. 1 were operated at pilot scale with reactors of 2 litre total capacity running in a continuous mode. Feeds to the reactors were fresh monomers (0.874 kg/h of isobutene and 0.0204 kg/h of isoprene), 3.160 kg/h of recycled monomer from the recovery and 1.9 kg/h of technical hexane giving a monomer/hexane mass ratio of 68:32. During this run the monomer/common aliphatic medium mass ratio was changed from 50:50 to 74:26. The reaction temperature used was about −65° C. and a solution with 15 wt % of polymer was produced thereby. This material had a weight average molecular weight of about 475 kg/mol and an isoprene content of about 1.75 mol %. The solution from the reactors was fed to a distillation column with 40 trays and separation of the monomers from the rubber solution was effected. The solution was preheated to 42° C. and a re-boiler was used at the bottom of the column to maintain a bottom temperature of 113° C. A reflux condenser was used to return part of the overhead stream to the top of the column maintaining a temperature there of 36° C. The separation achieved in the column left less than 10 ppm of residual isoprene monomer in the separated rubber solution and 0.35% of hexane in the overhead monomer stream. The separated monomers were purified and then re-introduced to the solution polymerization reactor.

The separated rubber solution was halogenated using a pilot scale halogenation equipment. 10% supplemental technical hexane was added to the separated rubber solution and the bromination effected by using elemental bromine. Thereby, a brominated butyl polymer containing 1.8% bromine was produced. The bromobutyl rubber solution was then finished using conventional drying and finishing techniques.

The foregoing describes only certain preferred embodiments and other features and aspects of the invention will be evident to persons skilled in the art. Variants or equivalents of described elements that function in the same way may be substituted without affecting the way in which the invention works. All sub-combinations of the described features are intended by the inventor to be encompassed by the following claims.

The invention claimed is:

1. An integrated process for a solution polymerization and subsequent halogenation of a rubber obtained thereby in a common aliphatic medium, the process comprising:

a) providing a medium comprising
the common aliphatic medium comprising at least 50 wt.-% of one or more aliphatic hydrocarbons having a boiling point of 45° C. to 80° C. at a pressure of 1013 hPa, and
a monomer mixture comprising at least one isoolefin monomer and at least one multiolefin monomer
in a mass ratio of monomer mixture to common aliphatic medium of from 40:60 to 95: 5, b) polymerizing the monomer mixture within the medium to form a rubber solution comprising a rubber polymer dissolved in the medium comprising the common aliphatic medium and residual monomers of the monomer mixture wherein at least 90 wt. % of the rubber polymer is dissolved in the medium;

c) separating the residual monomers of the monomer mixture from the rubber solution to form a separated rubber solution comprising the rubber polymer and the common aliphatic medium, and d) halogenating the rubber polymer in the separated rubber solution.

2. The process of claim 1, wherein the rubber is a butyl rubber and the monomer mixture comprises isobutene and isoprene.

3. An integrated process for a solution polymerization and subsequent halogenation of butyl rubber in a common $C_6$ aliphatic medium, the process comprising:

a) providing a solution polymerization reactor containing the $C_6$ aliphatic medium mixed with a monomer mixture comprising at least an isoolefin monomer and a multiolefin monomer in a mass ratio of monomer mixture to medium of 61:39 to 80:20;

b) polymerizing the monomer mixture within the solution polymerization reactor to form a rubber solution comprising a butyl rubber polymer dissolved in the medium and including residual monomers of the monomer mixture;

c) separating the monomer mixture from the rubber solution to form a separated rubber solution comprising the butyl rubber polymer in the medium; and, d) halogenating the butyl rubber polymer in the separated rubber solution.

4. The process of claim 3, wherein the medium has a boiling point greater than about 45° C.

5. The process of claim 3, wherein the medium has a boiling point of about 50-69° C.

6. The process of claim 3, wherein the medium comprises n-hexane, hexane isomers, or a mixture thereof.

7. The process of claim 3, wherein the multiolefin comprises a conjugated diene.

8. The process of claim 3, wherein the isoolefin comprises isobutylene and wherein the multiolefin comprises isoprene.

9. The process of claim 3, wherein the mass ratio of monomers to solvent in the feed to the process is about 65:35 to 70:30.

10. The process of claim 3, wherein the polymerization step b) is conducted at a temperature of −50 to −74° C.

11. The process of claim 3, wherein the polymerization step b) is conducted at a temperature of −95 to −75° C.

12. The process of claim 3, wherein a solids level of butyl rubber in the $C_6$ solvent exiting the solution polymerization reactor is 14.5 to 18%.

13. The process of claim 3, wherein the butyl rubber has a weight average molecular weight of 300 to 1000 kg/mol.

14. The process of claim 3, wherein the viscosity of a polymerization solution exiting the solution polymerization reactor following step b) is below 2000 cP.

15. The process of claim 3, wherein the separating in step c) comprises distilling.

16. The process of claim 15, wherein the distilling produces a top stream comprising the monomer mixture and wherein the process further comprises purifying the top stream to form a purified stream consisting essentially of the monomer mixture and the $C_6$ medium.

17. The process of claim 16, wherein the process further comprises recycling the purified stream of the monomer mixture back into the solution polymerization reactor.

18. The process of claim 3, wherein the halogenating in step d) comprises brominating or chlorinating the butyl rubber polymer.

19. The process of claim 3, wherein the process further comprises adding a supplemental solvent and/or water to the separated rubber solution prior to or concurrently with step d).

20. The process of claim 3, wherein the separated rubber solution contains less than or equal to about 20 ppm by weight of residual monomers.

21. The process of claim 17, wherein a halogenated butyl rubber polymer is produced in step d) and wherein the process further comprises separating the $C_6$ medium from the halogenated butyl rubber polymer followed by purifying the $C_6$ medium to form a purified $C_6$ medium.

22. The process of claim 21, wherein the process further comprises recycling the purified $C_6$ medium back into the solution polymerization reactor.

* * * * *